May 26, 1964
HANNS-DIETER PASCHKE
3,134,337
GEARING FOR ROTARY MECHANISMS
Filed June 28, 1961
2 Sheets-Sheet 1
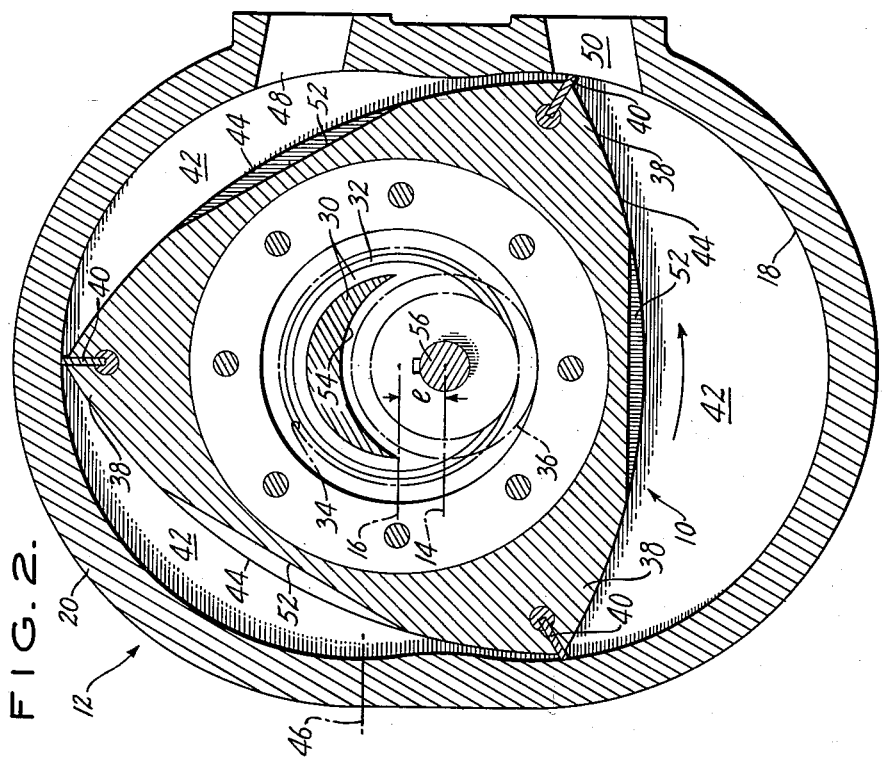
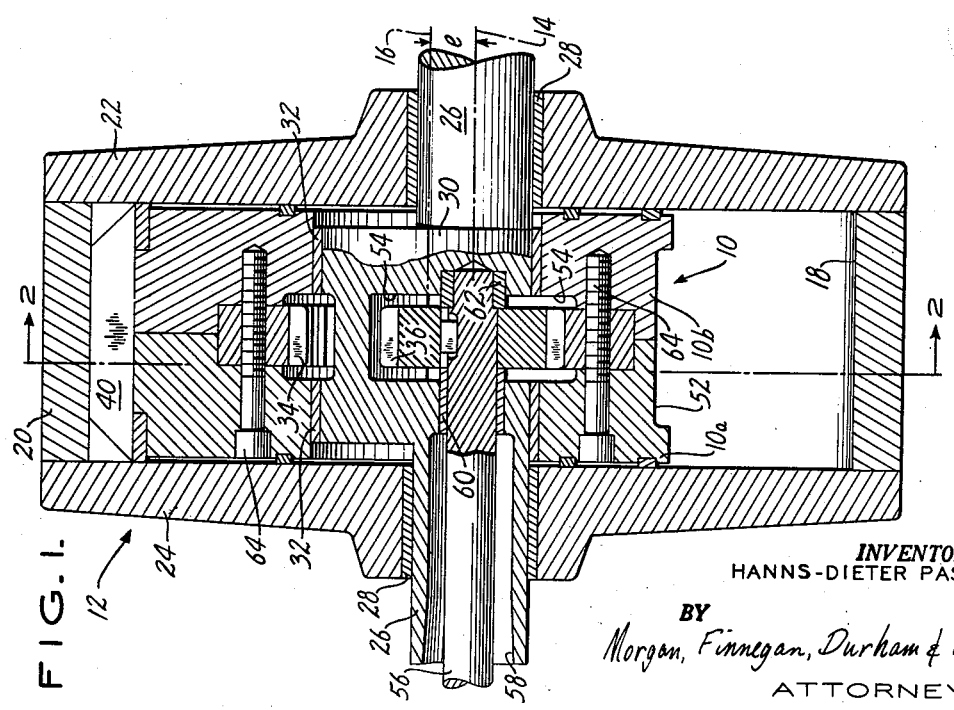
*INVENTOR.*
HANNS-DIETER PASCHKE
BY
*Morgan, Finnegan, Durham & Pine*
ATTORNEYS May 26, 1964  HANNS-DIETER PASCHKE  3,134,337
GEARING FOR ROTARY MECHANISMS
Filed June 28, 1961  2 Sheets-Sheet 2
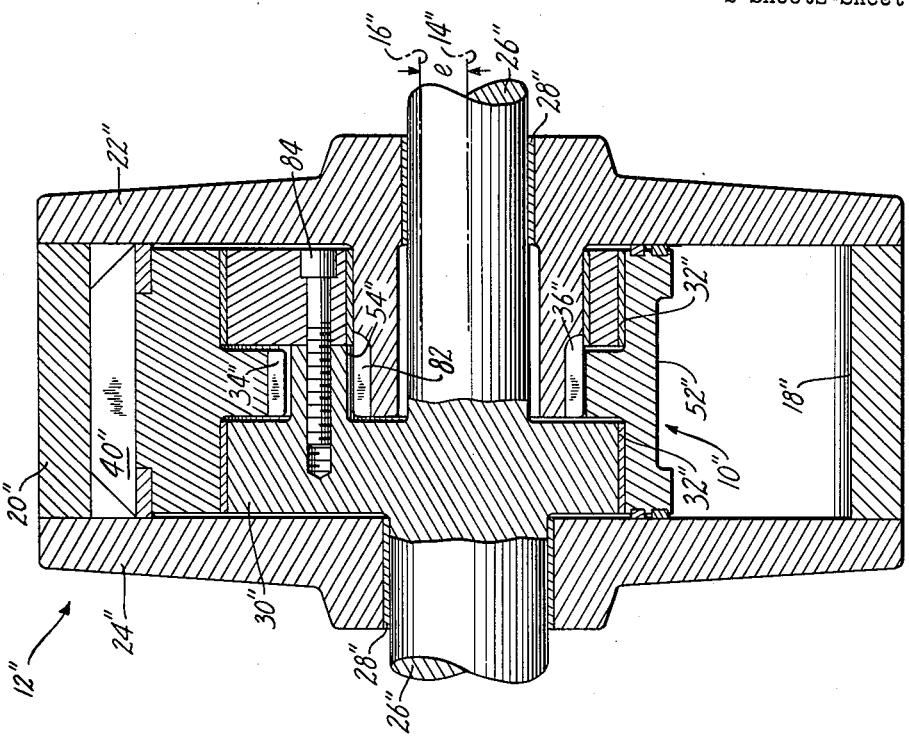
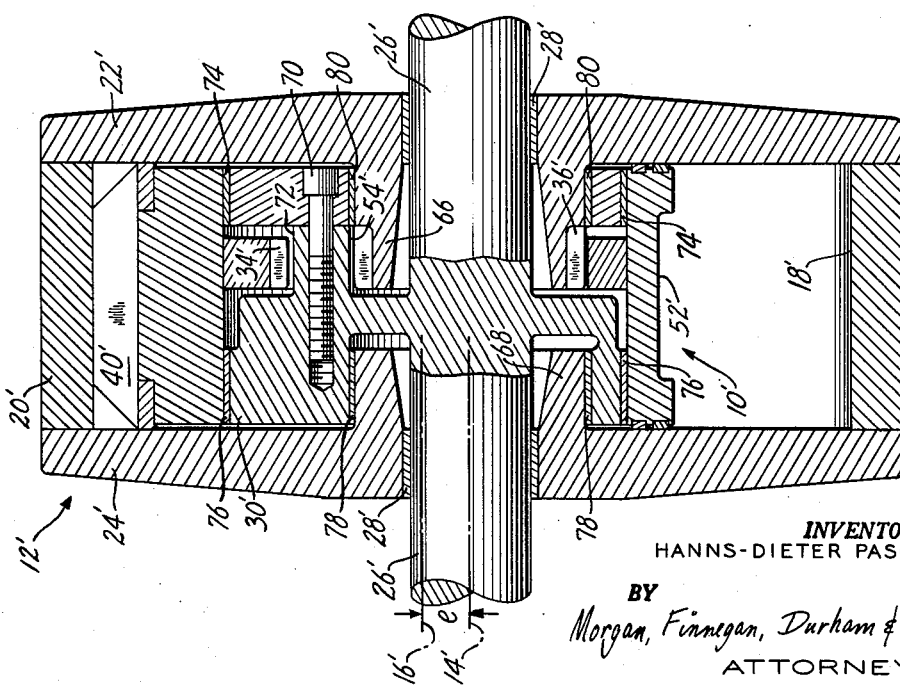
INVENTOR.
HANNS-DIETER PASCHKE
BY
Morgan, Finnegan, Durham & Pine
ATTORNEYS

3,134,337
GEARING FOR ROTARY MECHANISMS

Hanns-Dieter Paschke, Neckarsulm, Germany, assignor to NSU Motorenwerke Aktiengesellschaft, Neckarsulm, Germany, and Wankel G.m.b.H., Lindau, Germany
Filed June 28, 1961, Ser. No. 120,439
Claims priority, application Germany June 29, 1960
10 Claims. (Cl. 103—130)

This invention relates to gearing for rotary mechanisms, and more particularly to gearing between the outer body and rotor of such mechanisms for enforcing a desired speed ratio between the rotor and the eccentric shaft upon which it is mounted in mechanisms having a stationary outer body and the speed ratio between the rotor and the outer body in mechanisms having a rotary outer body. This invention also relates to means for creating such gearing in a form that divorces the size of the gearing from influencing the size of the shaft.

Although this invention is applicable to and useful in almost any type of rotary mechanism, such as rotary combustion engines, fluid motors, fluid pumps, compressors, and the like, it is particularly useful in rotary combustion engines. To simplify and clarify the explanation of the invention, the description which follows, will, for the most part, be restricted to the use of the invention in a rotary combustion engine. It will be apparent from the description, that with slight modification that would be obvious to a person skilled in the art, the invention is equally applicable to other types of rotary mechanisms.

This application is a continuation-in-part of my co-pending parent application Serial No. 21,989, filed April 13, 1960, now Patent No. 3,091,386. FIG. 5 of the parent application shows one form of achieving the objects of the present invention.

A more complete and detailed description of the rotary combustion engine that forms the basis for this invention may be found in U.S. Patent No. 2,988,065, issued June 13, 1960. The description of the rotary combustion engine contained in that patent is hereby incorporated in and made a part of the disclosure of this application.

The present invention is particularly useful in rotary mechanisms of the type that comprise an outer body having an axis, axially-spaced end walls, and a peripheral wall interconnecting the end walls. In such rotary mechanisms the inner surfaces of the peripheral wall and the end walls form a cavity, and the mechanism also includes a rotor that is mounted within the cavity on an eccentric portion of a shaft the axis of which is concentric with the axis of the cavity.

The speed ratio between the rotor and the eccentric shaft in an engine having a stationary outer body is enforced by a gearing that consists of an internally-toothed gear concentric with the axis of rotation of the rotor and fixed to the rotor that is in mesh with an externally-toothed gear that is secured to and stationary with respect to the outer body and preferably fixed to the outer body. The speed ratio in engines in which the rotor and the outer body are both rotary is also enforced by an internally-toothed gear secured to the rotor in mesh with an externally-toothed gear that is stationary with respect to the outer body and preferably secured to the outer body.

In previously known constructions of the rotary combustion engine this gearing was located between an end face of the rotor and the adjacent end wall of the outer body. In engines with a stationary outer body, the externally-toothd gear, when arranged in the known manner, determines the maximum diameter of the shaft, because the shaft extended through this gear. Also, the size of the gearing is determined by the eccentricity, and by the speed ratio that in turn depends on the shape of the engine, or the number of lobes contained by the outer body and the number of apex portions present on the rotor or inner body.

In engines having a rotary outer body, the size of the gearing is determined by the same factors, but in such engines the eccentric is supported by bearing pins that extend inwardly from the end walls of the outer body. In the previously known ways of creating the gearing, the size of this externally-toothed gear determined the maximum outer diameter of the bearing pin on which the externally-toothed gear was mounted.

When either of the foregoing types of rotary combustion engines are used with high compression ratios, e.g., when an engine is constructed using the diesel principle, small eccentricities are needed to obtain the desired compression ratio. When the eccentricity is small, however, the externally-toothed gear also becomes small, and in engines having a stationary outer body, if the eccentricity is small enough, it becomes impossible to construct a shaft extending through the externally-toothed gearing that has a large enough diameter to withstand the stresses induced by the high gas pressures generated in the engine.

In engines having a rotary outer body of the construction described, no gas pressures are exerted directly on the shaft or its eccentric portion, but the high gas pressures are transmitted to the bearing pins. The outer diameter of one of the bearing pins is limited by having the externally-toothed gear mounted upon it; consequently, the construction of a bearing pin of sufficient strength to take up the bending stresses exerted upon it becomes a serious problem.

It is a primary object of this invention to overcome the problems previously discussed by providing means for creating gearing within the rotor and within the eccentric so that the diameter of the shaft is not limited by the size of the externally-toothed gear in engines having a stationary outer body.

It is also a primary object of this invention to overcome the problems previously discussed by providing means for creating a gearing for rotary mechanisms in which the externally-toothed gear is carried within the eccentric on a bearing pin or stub that is stationary with respect to the outer body.

It is another object of this invention to provide means for creating gearing for use with engines having a stationary outer body that will locate the gearing within the rotor and within the eccentric so that the diameter of the shaft is not limited by the size of the externally-toothed gear.

Another object of this invention is to provide means for creating gearing for use with an engine having a rotary outer body in which the support of the eccentric on the bearing pins or stubs can be located so close to the end walls of the outer body that the bending stresses exerted on the bearing pins or stubs will be very small and also so that the outer diameter of the bearing pins or stubs is not limited by the size of the externally-toothed gear.

A still further object of this invention is to provide means for creating gearing within the rotor and eccentric that permits the width of the rotor to be increased without deleterious effect, because this invention provides means for centering the adjusting forces that keep the rotor in phase through the gearing to prevent these forces from acting one-sidedly on the rotor as they might if the rotor had been made wide with the gearing located at one end face of the rotor.

To achieve the foregoing objects, and in accordance with its purpose, this invention provides means which, as embodied and broadly described, comprise creating gearing such that the externally-toothed gear may be located within the eccentric on a pin or stub that is stationary with respect to the outer body.

Additional objects and advantages of the invention will be set forth in part in the description that follows and in part will be obvious from the description or may be learned by practice of the invention, the objects and advantages being realized and attained by means of the instrumentalities and combinations particularly pointed out in the appended claims.

The invention consists in the novel parts, constructions, arrangements, combinations, and improvements shown and described.

The accompanying drawings that are incorporated in and constitute a part of this specification, illustrate one embodiment of the invention and together with the description serve to explain the principles of the invention.

Of the drawings:

FIG. 1 is a central vertical section of a rotary combustion engine showing one embodiment of the present invention;

FIG. 2 is a sectional view of the rotary mechanism taken along line 2—2 of FIG. 1;

FIG. 3 is a central vertical section of a rotary combustion engine showing another embodiment of the present invention; and FIG. 4 is a central vertical section of a rotary combustion engine showing a third embodiment of the present invention.

It is to be understood that both the foregoing general description and the following detailed description are exemplary and explanatory but are not restrictive of the invention.

Reference will now be made in detail to the present preferred embodiment of the invention, an example of which is illustrated in the accompanying drawings.

In accordance with the invention, a rotary combustion engine and means for creating gearing that will place the externally-toothed gear within the eccentric on a pin or stub that is stationary with respect to the outer body are provided. As embodied, and as shown in FIGS. 1 and 2, the present preferred embodiment of the invention includes a rotary combustion engine comprising a stationary outer body 12 that includes end walls 22 and 24 and a peripheral wall 20 interconnecting these end walls.

The inner surface 18 has a contour that is basically a two-lobed epitrochoid as shown in FIG. 2.

As embodied and as shown in FIGS. 1 and 2, the present preferred embodiment of the invention includes a rotary combustion engine comprising a generally triangular rotor 10 having arcuate sides that is eccentrically supported for rotation within an outer body 12.

Although in the illustrative embodiment shown in the drawings the outer body 12 is fixed or stationary, a practical and useful form of the invention may be constructed in which both the outer body and rotor are rotary as previously described; in this latter form of the invention, the power shaft is driven directly by rotation of the outer body and the inner body or rotor rotates relative to the outer body. One embodiment of this form of the invention is illustrated in FIG. 5 of the parent application (Serial No. 21,989).

As shown in FIGS. 1 and 2, and as here preferably embodied, the rotor 10 rotates on an axis 14 that is eccentric from and parallel to the axis 16 of the curved inner surface of the outer body 12. The distance between the axes 14 and 16 is equal to the effective eccentricity of the engine. The curved inner surface 18 of the outer body 12 has basically the form of an epitrochoid in geometric shape and includes two arched lobe-defining portions or lobes.

As embodied, the generally triangular shape of the rotor 10 corresponds in its configuration to the "inner envelope" or the maximum profile of the rotor that will permit interference free rotation of the rotor 10 within the outer body 12.

In the form of the invention illustrated, the outer body 12 comprises a peripheral wall 20 that has for its inner surface the curved inner surface 18, and a pair of axially-spaced end walls 22 and 24 that are disposed on opposite sides of the peripheral wall 20.

The end walls 22 and 24 support a shaft 26, the geometric center of which is coincident with the axis 16 of the outer body 12. This shaft 26 is supported for rotation by the end walls 22 and 24 on bearings 28. A shaft eccentric 30 is rigidly attached to or forms an integral part of the shaft 26, and the rotor 10 is supported for rotation or rotatably mounted upon the shaft eccentric 30 by a rotor bearing 32. The shaft eccentric 30 has axially-spaced end faces opposite the end walls 22 and 24, respectively, of the outer body 12.

As shown most clearly in FIG. 2, the rotor 10 includes three apex portions 38 that carry radially movable sealing members 40. The sealing members 40 are in substantially continuous gas-sealing engagement with the inner surface 18 of the outer body 12 as the rotor 10 rotates within and relative to the outer body 12.

By means of the rotation of the rotor 10 relative to the outer body 12, three variable volume working chambers 42 are formed between the peripheral working faces 44 of the rotor 10 and the inner surface 18 of the outer body 12. As embodied in FIG. 2, the rotation of the rotor relative to the outer body is counter-clockwise and is so indicated by an arrow.

A spark plug 46 is mounted in the peripheral wall 20 of the outer body 12, and at the appropriate time in the engine cycle the spark plug 46 provides ignition for a compressed combustible mixture which, on expansion, drives the rotor in the direction of the arrow. As previously stated, the rotary combustion engine may also be operated as a diesel, and when it is operated as a diesel, the spark plug 46 is not required, since ignition of the fuel mixture is initiated by the temperature reached through high compression of the working air.

Also as shown in FIG. 2, one lobe of the epitrochoidal inner surface 18 is provided with an intake port 48, and the other lobe is provided with an exhaust port 50. As the rotor 10 rotates, a fresh charge is drawn into the appropriate working chamber 42 through the intake port 48. This charge is then successively compressed, ignited, expanded, and finally exhausted through the exhaust port 50.

All four successive phases of the engine cycle: intake, compression, expansion, and exhaust take place within each one of the variable volume working chambers 42 each time the rotor 10 completes one revolution within the outer body, and for each revolution of the rotor, the engine completes a cycle.

The working faces 44 of the rotor 10 are provided with cutout portions or channels 52 that permit combustion gases to pass freely from one lobe of the epitrochoidal inner surface 18 to the other lobe when the rotor is at or near the dead center of maximum compression position. Also, a desired compression ratio for the engine may be attained by appropriate proportioning of the channels 52.

The speed ratio between the rotor 10 and the shaft 26 and eccentric 30 in this embodiment of the invention is 1:3. This speed ratio is enforced by gearing that comprises an externally-toothed gear 36 that is concentric with the axis of the epitrochoidal contour of the inner surface 18 and fixed or stationary with respect to the outer body, and an internally-toothed gear 34 that is concentric with the axis 14 of the rotor 10 and fixedly secured to the rotor. The gear ratio of this gearing or the ratio between the externally-toothed gear 36 and the internally-toothed gear 34 is 2:3.

From this construction, it may be observed that the gearing 34 and 36 does not drive or impart torque to the shaft 26 but merely serves to enforce the speed ratio between the rotor and the shaft 26 and to index or register the position of the rotor 10 with respect to the outer body 12 so that the rotor is forced to remain in phase. The gearing thus also helps to remove the positioning load that would otherwise be placed upon the apex portions of the rotor 10.

As shown in FIG. 1, the externally-toothed gear 36 is located within a recess 54 between the end faces of the eccentric 30 on a fixed pin 56 that extends through a central bore 58 in the shaft 26 and eccentric 30. The pin 56 is supported within the central bore 58 by bearings 60 and 62.

In accordance with the invention, the pin 56 is stationary with respect to the outer body, and may, for example, be connected to the end wall 24 in a manner not shown to fixedly secure it with respect to the outer body. The internally-toothed gear 34 meshes with the externally-toothed gear 36 and is fixedly secured to the rotor 10 by means of screws 64. In the illustrated embodiment shown in FIG. 1, the rotor 10 comprises two parts 10a and 10b, and these parts are held together by the screws 64.

In accordance with the invention, it will be observed that the construction of FIG. 1 provides means by which the diameter of the shaft 26 is no longer limited by the size of the externally-toothed wheel 36. The invention thus permits the shaft 26 to be made of a much larger diameter than was possible under previous known methods of creating the gearing.

The embodiment of this invention shown in FIGS. 1 and 2 can be easily modified for use with an engine having a rotary outer body. In such an engine, the shaft 26 would be made stationary and the outer body 12 would become rotary around the shaft 26 with the power shaft being driven directly through rotation of the outer body.

In accordance with the invention, a second possible embodiment is shown in FIG. 3. The same reference characters have been used for the same or similar parts in FIG. 3, but the reference characters for FIG. 3 are primed.

In the embodiment of FIG. 3, the eccentric 30' is supported by hollow bearing pins 66 and 68 that extend inwardly from the end walls 22' and 24'. Through this construction, the bending stresses on the shaft eccentric 30' and shaft 26' resulting from the gas pressures in the engine working chambers are minimized. This particular arrangement of the bearing pins 66 and 68 is also disclosed in my copending application Serial No. 844,728, filed October 6, 1959, now Patent No. 3,012,550, issued December 12, 1961.

The gearing for enforcing the desired speed ratio between the rotor 10' and the shaft 26' comprises the externally-toothed wheel 36' that is fixedly secured on the bearing pin 66 and in mesh with the internally-toothed gear 34' that is fixedly secured to the rotor 10'. The externally-toothed gear 36' is located within a radial recess 54' between the end faces of eccentric 30' that is parted in the plane of the externally-toothed gear 36'. These two parts of the eccentric 30' are connected by screws 70. The eccentric 30' is provided with a peripheral groove 72 into which the internally-toothed gear 34' projects. In accordance with the invention, the means just described permits the diameters of the bearings 78 and 80 of the eccentric 30' to be made considerably larger than would otherwise be possible with gearing of the size dictated by the speed ratio and eccentricity requirements.

By permitting the location of the gearing within the eccentric, the form of the invention shown in FIG. 3, permits the bearings 78 and 80 by which the eccentric 30' is supported on the bearing pins 66 and 68 to be placed as close as possible to the inner surfaces of the end walls 22 and 24. This close placement of the bearings 78 and 80 to the end walls 22 and 24 minimizes the bending stresses that are exerted on the bearing pins 66 and 68, and in fact makes these bending stresses extremely small.

An additional advantage of the construction shown in FIG. 3 is that the bearing pins 66 and 68 in the region of the bearings 78 and 80 no longer have their diameters limited by the size of the externally-toothed gear 36'.

A third embodiment of this invention is shown in FIG. 4, and the same reference characters have been used in FIG. 4 to designate the same or similar parts as in the previous figures, but in FIG. 4 they are double primed.

The embodiment of the invention shown in FIG. 4 closely corresponds to that shown in FIG. 3, the primary difference being that only one part of the two-part eccentric 30" is supported by a bearing pin 82 that is secured to end wall 22". The end wall 24" has no bearing pin and the second part of the eccentric 30" is supported in the usual manner by the shaft 26". The internally-toothed gear 34", in the embodiment of FIG. 4, is made of one piece with the rotor 10".

Similarly to FIG. 3, the externally-toothed gear 36" of FIG. 4 is fixedly secured to the bearing pin 82. The two parts of the eccentric 30" are secured together by screws 84.

The embodiments of FIGS. 3 and 4 can also be used for engines having rotary outer bodies in which the outer body 12 as well as the rotor 10 rotate about fixed axes; the construction of such an engine, but without means for creating gearing within the rotor and eccentric, is shown and described in my copending application Serial No. 844,728, filed October 6, 1959, now Patent No. 3,012,550, issued December 12, 1961.

FIG. 5 of the parent application (Serial No. 21,989) of the present application shows means for creating the gearing of this invention within the rotor and eccentric. FIG. 5 of the parent application shows a rotary outer body embodiment of the engine, and thus discloses means for creating the gearing of the present invention in a rotary combustion engine having a rotary outer body.

This invention in its broader aspects is not limited to the specific mechanisms shown and described, but also includes within the scope of the accompanying claims any departures made from such mechanisms that do not sacrifice its chief advantages.

What is claimed is:

1. A rotary mechanism comprising a hollow outer body having an axis, axially-spaced end walls, and a peripheral wall interconnecting the end walls; a shaft member coaxial with the outer body and having an eccentric portion, the eccentric portion having an axis disposed parallel to but eccentric from the axis of the outer body and having axially-spaced end faces opposite the end walls of the outer body, the shaft member being rotatable relative to the outer body, a rotor mounted upon the eccentric portion for rotation relative to and coaxial with the eccentric portion, an internally-toothed gear fixed relative to and coaxial with the rotor, an externally-toothed gear fixed relative to and coaxial with the outer body and the externally-toothed gear being positioned between the end faces of the eccentric portion and in mesh with the internally-toothed gear.

2. The invention as defined in claim 1, in which the shaft member has a central bore and which also includes a pin that extends through this bore past the inner surface of the adjacent end wall, the externally-toothed gear being fixed to the pin.

3. The invention as defined in claim 1, in which the eccentric portion of the shaft member includes a radial recess for accommodating the externally-toothed gear.

4. The invention as defined in claim 1, which also includes a tubular pin that is concentric with the shaft member and to which the externally-toothed gear is fixed.

5. The invention as defined in claim 1, in which the eccentric portion of the shaft member comprises two parts that are detachably connected with each other and in which the juncture of the two parts is in the plane of the externally-toothed gear.

6. The invention as defined in claim 4, which also includes a second tubular pin concentric with the shaft member, the first tubular pin to which the externally-toothed gear is fixed being secured to one end wall of the outer body and the second tubular pin being secured to the other end wall of the outer body.

7. The invention as defined in claim 1, in which the outer body is stationary and the shaft member including its eccentric portion is rotary.

8. The invention as defined in claim 1, in which the shaft member and its eccentric portion are stationary and the outer body is rotary.

9. The invention as defined in claim 1, that also includes a first tubular pin that is concentric with the shaft member, a second tubular pin also concentric with the shaft member, the first tubular pin carrying the externally-toothed gear and being secured to one end wall of the outer body, the second tubular pin being secured to the other end wall of the outer body, the eccentric portion of the shaft member being partially rotatably supported on each of the two pins, and bearing surfaces located between each pin and the eccentric portion.

10. The invention as defined in claim 1, that also includes a tubular pin that is concentric with the shaft member, and in which the eccentric portion is partially supported for rotation upon the pin by a bearing surface.

References Cited in the file of this patent
UNITED STATES PATENTS

| | | |
|---|---|---|
| 1,292,091 | Schirmer et al. | Jan. 21, 1919 |
| 1,442,828 | Rotermund | Jan. 23, 1923 |
| 1,769,047 | Weeden | July 1, 1930 |
| 2,988,065 | Wankel et al. | June 13, 1961 |
| 3,007,460 | Bentele et al. | Nov. 7, 1961 |
| 3,012,550 | Paschke | Dec. 12, 1961 |